United States Patent [19]

Bystron et al.

[11] 3,899,949

[45] Aug. 19, 1975

[54] APPARATUS FOR AUTOMATICALLY CUTTING GARMENTS

[75] Inventors: Bruno Bystron, Ingolstadt; W. Gerhard Hoeber, Ingolstadt-Oberhaunstadt; Georg Goldammer, Ingolstadt-Friedrichshofen, all of Germany

[73] Assignee: Schubert & Salzer Maschinenfabrik Aktiengesellschaft, Ingolstadt, Germany

[22] Filed: Sept. 28, 1973

[21] Appl. No.: 401,658

[30] Foreign Application Priority Data

Sept. 30, 1972 Germany.............................. 2248043

[52] U.S. Cl. .......................... 83/565; 33/12; 83/747; 83/925 CC
[51] Int. Cl............................................. D06h 7/24
[58] Field of Search .............. 83/565, 925 CC, 747; 33/11, 12, 17 R, 14

[56] References Cited
UNITED STATES PATENTS 3,245,295   4/1966   Mueller.......................... 83/925 CC
3,769,488   10/1973  Hasslinger...................... 83/925 CC Primary Examiner—J. M. Meister
Attorney, Agent, or Firm—Robert W. Beach; R. M. Van Winkle

[57] ABSTRACT

Pattern pieces are arranged on a backing plate with connectors connecting salient angles of adjacent pieces to form extensions of both sides of such angles providing crossing continuous lines for guiding a cutting tool in response to a sensing device cooperating with the pattern layout or a pattern plate photographically reproduced therefrom. Garment components, therefore, are completely severed from any adjoining fabric. Such sensing device includes a central pattern line sensor and four additional auxiliary sensors arranged symmetrically therearound. The four auxiliary sensors are connected in an electronic circuit for controlling the direction of travel of a cutting tool to replicate the continuous lines formed by the pattern pieces and their connectors, or to turn in the appropriate direction at an angular discontinuity of a pattern component margin.

17 Claims, 8 Drawing Figures

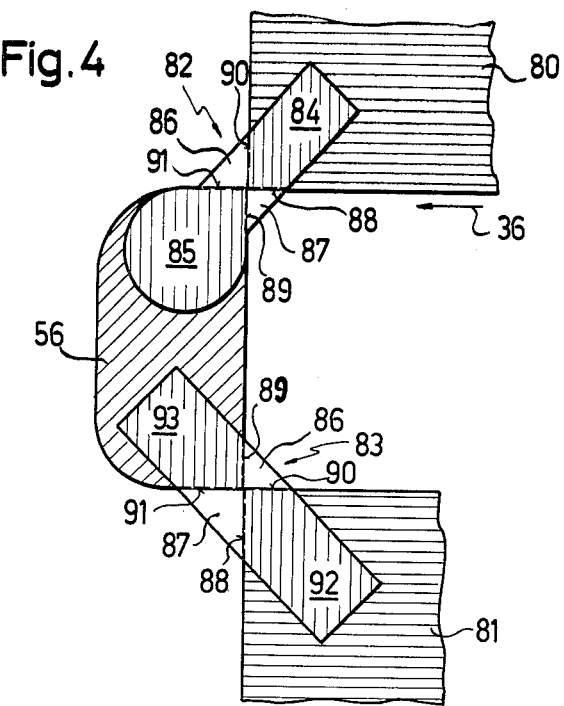
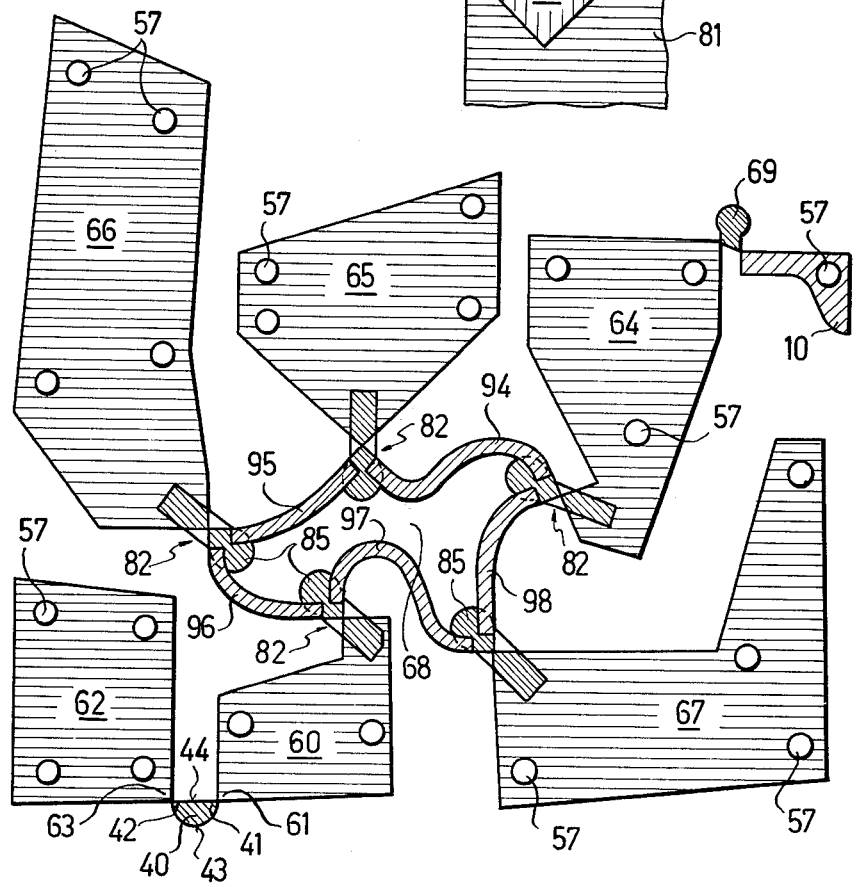

APPARATUS FOR AUTOMATICALLY CUTTING GARMENTS

The present invention relates to a method for automatically cutting garment components from flat material whereby a sensing device senses a pattern layout or a reproduction of the pattern layout and transmits signals to control the cutting tool for cutting fabric according to such pattern layout and to apparatus for carrying out such method.

In prior automatic cutting devices there have been no means for controlling the direction of the sensing device and cutting tool when two or more lines intersect, such as when two pattern pieces are laid corner to corner. In order to cut garment components from two or more pattern pieces without interrupting the operation at the completion of each pattern piece, DT-PS No. 1,256,173 discloses the method of spacing adjacent pattern pieces and cutting small bridging strips of cloth between the adjacent pieces. Consequently, the individual garment components must be separated by the manual operation of clipping the bridging strips from the component body. Only a few thicknesses of fabric could be cut simultaneously, and a large amount of time is necessary for this work.

It is, therefore, the principal object of this invention to provide a method and apparatus for analog guidance of a cutting tool to effect cutting of garment components or other shapes from flat fabric free of connecting or bridging strips.

This object is accomplished in accordance with the present invention by combining individual pattern pieces in a layout whereby the apex of a salient angle of one piece touches the apex of a salient angle of an adjacent piece, arranged so that each side of one angle is substantially aligned with a side of the other angle to form a pair of crossing continuous lines. The crossed lines formed at the junctions of the connected angles by such disposition of the pattern pieces are followed automatically by a sensing device which transmits signals for automatically controlling travel of the cutting tool. The pattern layout may be followed by a direct contact sensor. Alternatively, the pattern pieces may be laid out on a horizontal plate and secured thereto, such as by magnets, the plate rotated to a vertical position and photographed to create a diapositive program carrier, which diapositive program carrier cooperates with the sensing device for controlling the cutting tool.

The method of the present invention is carried out by laying the pattern pieces in an arrangement whereby a salient angle on each of two pattern pieces are disposed so that their apexes touch and their sides form crossing lines, one pattern piece being arranged at one side of a crossing line including a side of its salient angle and the adjacent piece being arranged at the opposite side of such line including a side of its corresponding salient angle. Since pattern pieces cannot always be laid out in such an arrangement for various reasons, such as maximum utilization of fabric or because of the irregular shape of a pattern piece, for example, the pattern layout may include connecting pieces which are contoured to form salient corner connections with each of two or more pattern pieces joined thereby. If the cutting device is provided with a programed cutting tool control device, such as disclosed in German DT-OS No. 1,460,140 and DT-OS No. 1,804,550, so that the cutting tool is rotated in one direction for cutting salient angles and in the opposite direction for cutting reentrant angles in the pattern layout, adjacent pattern pieces can be connected by connecting pieces having an edge which forms a continuous unbroken line joining salient angles of adjacent pattern components. Each end of such continuous line terminates in a substantially straight portion forming a continuation of the line constituting one side of a salient angle of a pattern piece.

In order to simplify the pattern layout and permit use of connecting pieces not custom-shaped for a particular pattern layout, connecting pieces are provided which have opposite sections each having a salient angle projecting toward the other section with the apexes abutting. Such connecting pieces could overlie salient angles of each of two adjacent pattern pieces and serve as a guide for locating and positioning such pattern pieces in appropriate attitudes. Alternatively, one end portion of a connector could overlie a pattern piece salient angle and the other end portion could underlie the end of a continuous margin connecting strip so that such end of the connecting strip need not have an end portion custom fit to the particular angle or configuration of the pattern piece with which it is joined.

A pattern layout can be assembled by drawing on an appropriate background, or by mounting paper sheets or cardboard or plastic pattern components on a table, for example. The pattern and connecting pieces have a color or opacity in sharp contrast to the table, so that a photograph of the composite layout reproduces the layout in sharp black-white contrast. It is advantageous to use connecting pieces which are adhesive labels both for holding the connecting pieces in place and to help hold the pattern pieces in place.

In some instances it may be preferable to combine a number of pattern pieces by a single connector in an arrangement for which stock connecting pieces are not suitable. In such cases a custom connecting piece could be manufactured together with manufacture of the pattern pieces for a particular garment. Another expedient for connecting several pattern pieces by a common connector is to join several connecting pieces of strip form together in a relationship whereby the overlapping or abutting strip ends form salient angles on the periphery of the composite connector.

In order to dispose a pattern layout for convenient sensing or for storage in a program carrier in accordance with the present invention, a plate rotatable about a horizontal axis is provided on which the pattern pieces are arranged. Advantageously, the rotatable plate is magnetizable and the pattern pieces and connectors are made of paper which can be pressed against the plate by permanent magnets placed on the pattern pieces and connectors. For producing a program carrier in the form of a diapositive, the horizontal axis of the rotatable plate is located at a definite distance from a photographic device. The plate is disposed horizontally for convenience in laying out the pattern and is then pivoted to a vertical position with the layout on the side facing the photographic device. A light source, including a reflector, is prepositioned to illuminate the plate area uniformly in such vertical position. Consequently, layout of a pattern and production of a diapositive program carrier can be rapidly and readily effected at a single working station.

Instead of the sensing device described in the aforementioned DT-OS No. 1,460,140 and DT-OS No. 1,804,550, a sensing device having a pivot with its axis disposed perpendicular to a program carrier to be sensed may carry a light barrier guide for sensing the pattern outline representing the fabric cutting line and at least four auxiliary light barriers evenly distributed around the sensing guide and symmetrically arranged relative to an imaginary line through the guide and the pivot axis.

As used herein, the term pattern layout includes the arrangement of pattern components on a backing plate to cooperate with the sensing means regardless of whether the pattern layout constitutes the original components actually manipulated relative to a backing sheet to form the arrangement or a reproduction thereof such as a diapositive or any other form capable of being sensed to manipulate a cutting tool. Pattern components may be an arrangement of pattern pieces which correspond to garment components or a combination of pattern pieces, connecting elements and any other devices included in the layout and having an outline to be sensed or followed by sensing means. A continuous line is a line of any length which does not include any interruption sensing line means any line in the layout which is to be translated to effect guidance of a cutting tool for cutting fabric along the same contours whether according to the same or a different scale.

FIG. 4 is a fragmentary plan of a pattern layout including stock connecting pieces.

FIG. 5 is a top plan of another pattern layout including a composite connector utilizing stock connecting pieces and strip connecting pieces.

In the past all parts of a sensing pattern have been arranged so that the sensing line was an endless line having no intersecting lines. Pattern pieces were connected by bridging strips, so that there was no problem with regard to the direction in which the endless line is followed by the sensing means. Discontinuities in the sensing line occurred only at a corner, which corner had to form either a salient angle or a reentrant angle; and the cutting device could be turned either clockwise or counterclockwise corresponding to which of the two types of angles the sensing device encountered. Sensing lines never crossed, however, because then the direction of rotation would be indeterminate and incapable of being controlled.

It has been found by experimentation that such bridging strips in the cut fabric can be eliminated by use of the method of this invention. According to the method of the present invention the layout to be traced, including pattern pieces and, where necessary, connecting pieces, forms an endless sensing line which includes crossing lines. Cutting of fabric according to such an endless line effects severance of every garment component from every other garment component and from all connecting pieces. Two separate pattern pieces are joined only at the location of a salient angle of each piece, with the apexes of the angles contacting in a manner such that each side of each angle is substantially in alignment with a side of the other angle to form a pair of continuous crossed sensing lines. If each salient angle is a right angle, the crossing sensing lines will intersect at right angles. At such intersections the sensing device automatically senses only the crossing line along which it is travelling and emits guide signals for guiding the cutting tool to replicate that continuous line.

Figure 1:
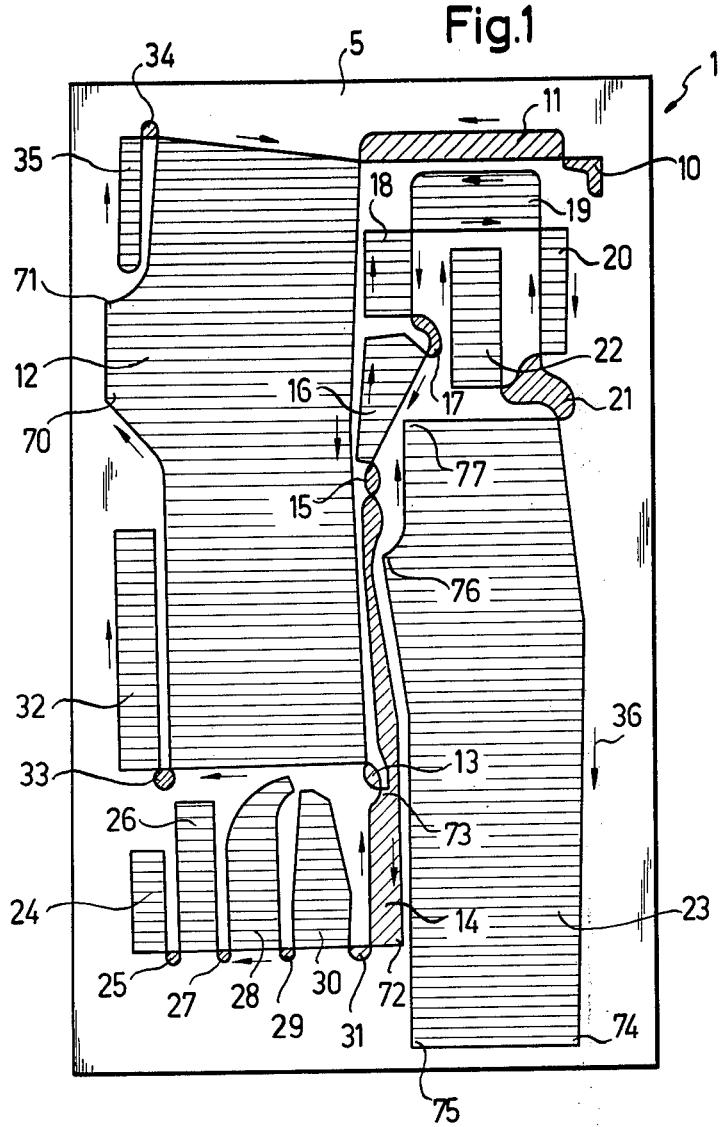
FIG. 1 is a top plan of a pattern layout in accordance with the present invention for manufacture of trousers.

In FIG. 1 a pattern layout is shown as one example of an application of the present invention. This layout is especially suited for use with a sensing device and a cutting tool drive whereby the direction of turning of the cutting tool is dependent on whether a sensed corner is a reentrant angle or a salient angle. This type of sensing device must travel around the pattern components in one predetermined direction from a fixed starting position along the sensing path and return to such starting position, in order to prevent the cutting device when reaching the next angle from pivoting through 180° and returning on its arrival path. To a limited degree such sensing device can follow curves without difficulty even when a pattern component is positioned to be sensed in the direction opposite to such predetermined direction. The embodiment of the invention shown in FIG. 1 presents a pattern layout which solves the problem of completely separating garment components from each other and from all other fabric pieces while utilizing a conventional sensing device.

The pattern layout 1 is a pattern for trousers having thirteen pattern components 12, 16, 18, 19, 20, 22, 23, 24, 26, 28, 30, 32 and 35; twelve connecting pieces 11, 13, 14, 15, 17, 21, 25, 27, 29, 31, 33 and 34 are located to cooperate with the pattern pieces to connect salient angles of the individual pieces. A composite layout is thus provided for effecting cutting of fabric blanks to separate all the garment components corresponding to the pattern pieces completely from adjoining garment components and from adjoining connecting pieces. For clarity, the pattern components are indicated by horizontal surface lines and the connecting pieces are indicated by diagonal surface lines. Element 10 is a stop-start guide piece for the cutting device, and for this reason is placed at a predetermined location on the pattern layout 1.

Figure 6:
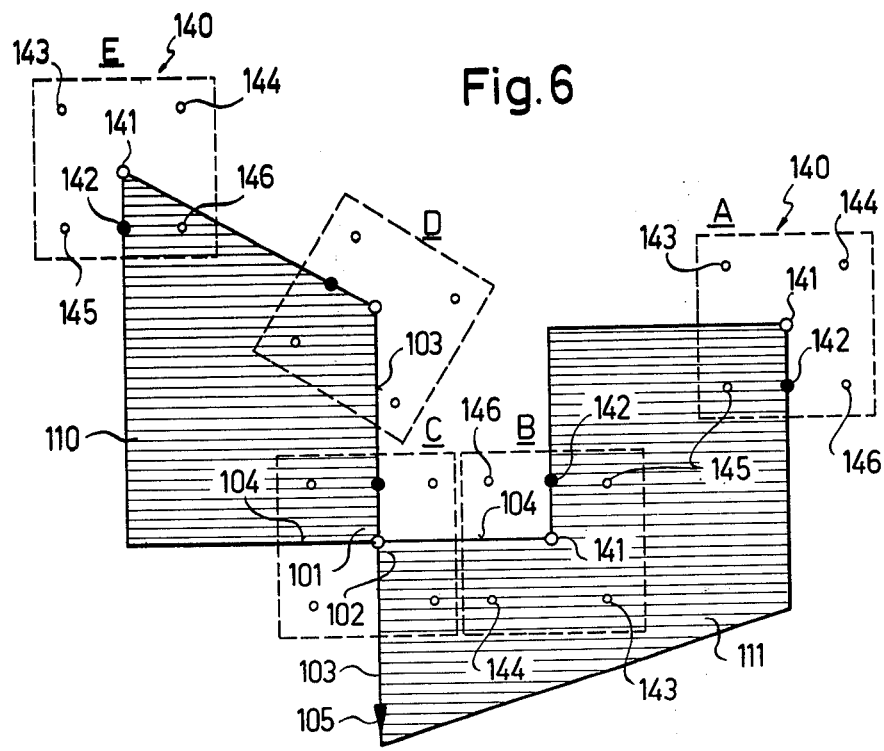
FIG. 6 is a top plan of a pattern layout showing sequential positions of a sensing device of the present invention.

Before describing the sensing procedure for the layout of FIG. 1, reference is made to the enlarged simplified view of FIG. 6 which illustrates a representative salient corner connection. The apex of salient angle 101 of pattern piece 110 touches the apex of adjacent salient angle 102 of pattern piece 111. Angles 101 and 102 are equal and the pieces 110 and 111 are arranged so that the sides of one angle are in alignment, respectively, with the sides of the other angle. Such angle sides thus form two straight crossing lines 103 and 104. As can be seen, pattern piece 111 lies at one side of the continuous crossing line 103 formed by one side of each of the corners 101 and 102, and pattern piece 110 lies at the opposite side of line 103. Similarly, pattern piece 110 lies at one side, i.e., above, the other continuous crossing line 104 formed by the other sides of the corners 101 and 102, and the body portion of the pattern piece 111 which includes salient corner 102, lies at the opposite side of line 104, i.e., below such line as viewed in FIG. 6.

A new sensing device to be described below is required for tracing this pattern layout, but the sensing procedure at the salient angles is the same as in the layout of FIG. 1. The arrow 105 indicates the direction of travel of the sensing device along the sensing line and a cutting tool, such as shown in U.S. Pat. No. 3,304,820 to replicate the sensing line and thereby cut garment component from fabric. Assuming that the sensing device begins at the upper right salient corner of pattern piece 111, the sensing device travels first to the left as seen in FIG. 6 and then continues in a generally counterclockwise direction around the periphery of pattern piece 111 until it reaches line 104, whereupon the sensing device moves toward the left along that line and follows that continuous line onto the periphery of pattern piece 110. The sensing device continues to follow the periphery of pattern piece 110 traveling in a generally clockwise direction around that pattern component. When line 103 is reached, it is followed downward as a continuous unbroken line onto pattern piece 111, thereby crossing line 104. The sensing device continues around pattern piece 111 in a generally counterclockwise direction back to the beginning point. The cutting tool thus replicating the same path on a stack of fabric blanks, whether on the same or a different scale than the sensing line, severs the garment components corresponding to pattern pieces 110 and 111 from each other at the intersection of lines 103 and 104.

While the salient corners 101 and 102 form right angles so that both sides of one angle form mutual straight extensions of the cooperating sides of the other angle, it is possible to connect salient corners where one or both of the crossing lines are not quite straight. Variations up to 20° between an imaginary extension of the side of one salient corner and the actual line formed by the cooperating side of the other salient corner can be allowed without producing a discontinuity signal. Such a signal normally arises at the point where a discontinuous line crosses another line causing the cutting tool to turn or to stop or to make a cutting error. An example of such limited variation from the straight line intersection is shown in FIG. 1 at the location where the upper end of pattern piece 12 joins the lower side of connecting piece 11.

Returning to FIG. 1, the arrows 36 on the layout 1 indicate the direction of travel of the cutting sensing device along the adjacent sensing line. Although in many instances the sensing device will not follow completely around one pattern piece before transferring to a portion of another pattern piece, as indicated by the above description in connection with FIG. 6, arrows 36 indicate that the direction of travel along each of the pattern pieces, with the exception of pattern piece 19, is in a generally clockwise direction. Because such pattern pieces are sensed in a clockwise direction, they can taken any desired form including additional salient and reentrant angles. Thus, for example, pattern piece 12 has, in addition to the salient corners by which it is joined with connecting pieces 11, 13, 33 and 34, further salient corners 70 and 71. Similarly connecting piece 14 has salient corners by which it is joined with connecting pieces 13, 15 and 31; and, additionally, it has a salient angle 72 and a reentrant angle 73. Pattern piece 23 has only one of its salient corners joined with a connecting piece, i.e., connecting piece 21, and it has four additional salient corners 74, 75, 76 and 77. The outline of pattern piece 19, on the other hand is followed in the counterclockwise direction, and, as stated above, conventional sensing devices will not accurately sense discontinuities at salient and reentrant angles when traveling in the abnormal direction. As can be seen, the only discontinuities in the sensing line periphery of connecting piece 11 are the salient corners by which it adjoins start-stop member 10 and pattern piece 12 so that the sides of the corners will be sensed as parts of continuous sensing lines when such connecting piece is combined with a pattern layout, instead of being sensed as salient corners. The balance of the periphery is a continuous line which makes it possible for the sensing device to operate in the counterclockwise direction of travel around connecting piece 11.

It should be noted that the various connecting pieces include one or more of the following characteristics:
  curved sides intersecting at sharp points such that the tangents of curvature at the point of intersection of the two curves forms an angle of approximately 90°. See for example the irregular connecting pieces 17 and 21 and the biconvex pieces 13 and 15;
  a straight side and a curved or arcuate side joined substantially at right angles, such as connecting pieces 25, 27, 29, 31, 33 and 34, in FIG. 1, which pieces are suitable for connecting side-by-side pattern pieces.

Connecting piece 11 is an elongated version of the second type, which can serve to span greater distances between the pieces to be connected.

A sensing device for tracing the pattern layout of FIG. 1 would follow an endless sensing line formed by the outline of the cooperating pattern and connecting pieces in the following sequence:
  beginning at the lower periphery of starting member 10, following the vertical line of intersection onto connecting piece 11, around the continuous upper margin thereof, downward along the right side of pattern piece 12, around the left curve of connecting piece 13 toward reentrant angle 73 of connecting piece 14, turning counterclockwise at the reentrant angle, following upward along the left side of connecting piece 14 along the curved right side of connector 15, traveling left along the lower end of pattern piece 16, turning clockwise at the salient angle, continuing upward along the left side and across the upper end to connecting member 17, along the right curve thereof, across the bottom, upward along the left side and across the top of pattern piece 18, across the bottom of pattern piece 19 and the top of pattern piece 20, down the right side and across the bottom of pattern piece 20, along the upper left curve of connecting piece 21, across the bottom and completely around pattern piece 22, along the lower left curve of connecting member 21, down the right side and continuing completely around pattern piece 23, along the right curve of connecting piece 21, upward along the left side of pattern piece 20, continuing upward along the right side and along the curved upper outline of pattern piece 19 (note: this pattern piece is being traced in a counterclockwise direction and therefore, the sensing line cannot have any discontinuities), down the right side of pattern piece 18, along the left curve of connector 17, down the right side of pattern piece 16, along the left curve of connecting piece 15, down the right side of connecting piece 14 to its salient angle 72, turning clockwise around such angle, traveling along the composite straight line from angle 72 to the lower left salient corner of pattern piece 24, upward along the left side across the top and down the right side of pattern piece 24, along the return bend defined by the arcuate side of connecting member 25, upward along the left side of pattern piece 26, this travel pattern continuing around pattern piece 26, connecting member 27, pattern piece 28, connecting piece 29, pattern piece 30, connecting member 31 and upward along the left side of connecting member 14 to connecting member 13, along the right curve of connecting member 13 and across the composite straight line formed by the lower ends of pattern pieces 12 and 32 connected by connecting piece 33, around pattern piece 32 and the arcuate side of connecting piece 33, up the left side of pattern piece 12, around the arcuate side of connecting piece 34, around pattern piece 35 and across the composite straight line formed by the upper end of pattern piece 35, the straight side of connecting member 34, the upper end of pattern piece 12, the straight side of connecting piece 11 and the upper side of stop member 10.

From this description it will be seen that the connecting pieces and pattern pieces are arranged so that all intersections between adjacent pieces are at salient angles, whereby the sensing line on the first piece of each junction joins a sensing line of a second piece to form a continuous line which may be either straight or curved.

It is not absolutely essential that pattern pieces and connecting pieces be alternated in the layout. Some pattern pieces may be of a shape to permit direct combination of two or more pattern pieces as illustrated in FIG. 1 by pattern piece 19, which connects pattern pieces 18 and 20. In some instances, on the other hand, in order to conserve fabric by forming a compact layout, it may be desirable for two or more connecting pieces to be combined to form a composite connector making a single connection between two pattern pieces. For example, in FIG. 1 pattern piece 12 is connected to pattern piece 16 by the composite connector formed from connecting pieces 13, 14 and 15.

In the latter case it would be possible to provide a special connector which would have the shape formed compositely by individual pieces 13, 14 and 15, but it is preferred that connecting pieces be of relatively few different shapes which could be provided as stock pieces usable with a variety of different garment patterns. Connecting piece 14 has various applications for connecting a large pattern piece with a number of smaller pieces and facilitates a compact layout in such cases.

As can be seen from FIG. 1, semicircular connectors recur throughout the layout, namely connecting pieces 25, 27, 29, 31, 33 and 34. A connecting piece of this configuration is shown on a larger scale in FIG. 5 as connector 40 joining pattern pieces 60 and 62. This connector has only two corners 41 and 42, both of which are salient corners, corner 41 being connected to salient corner 61 of pattern piece 60 and corner 42 being similarly joined to salient corner 63 of pattern piece 62. A straight side 44 completing the straight cutting line defined by the aligned sides of angles 61 and 63 forms a common side of angles 41 and 42, and a curved unbroken line 43 forms the opposite sides of angles 41 and 42. Line 43 combines with the substantially parallel sides of angles 61 and 63 to form an unbroken return bend in the endless sensing line of the pattern layout. Connecting pieces 11 and 33 are variations of such general shape. Similarly the biconvex shape of connecting pieces 13 and 15 is a highly versatile recurring shape. These common connector shapes advantageously could be produced in quantity, such as in perforated strip or roll form. The connectors could be supplied as self-sticking labels to facilitate rapid assembly of a pattern layout on a backing sheet 5.

Figure 2:
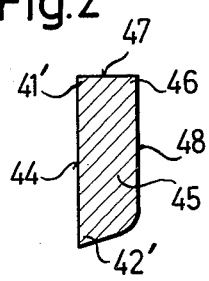
FIGS. 2 and 3 are top plans of representative connecting pieces for use with the present invention.
Figure 3:
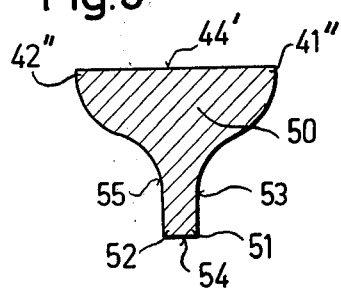

FIGS. 2 and 3 show two further representative connector shapes, which would have substantial versatility and could be stocked in quantity. Connector 45, shown in FIG. 2, can be used to connect adjacent corners of three pattern pieces like connector 21 is used in FIG. 1. Accordingly, it has three salient corners 41', 42' and 46, which corners are connected by continuous lines. Line 44, connecting corners 41' and 42', and line 47, connecting corners 41' and 46, are straight lines, and line 48 connecting corners 42' and 46 is curved. The connector shown in FIG. 3 can be used to connect adjacent corners of four pattern pieces. Such connector has four salient corners 41", 42", 51 and 52, adjacent corners being joined by unbroken connecting sensing lines 44', 53, 54 and 55. The opposite sides 44' and 54 are straight and sides 53 and 55 are of ogee configuration disposed as mirror images so that the upper corners 41" and 42" are spaced farther apart than lower corners 51 and 52.

The connecting pieces can be specially fabricated for customized use with the pattern for a particular garment or other item of manufacture; or, as stated previously, a small number of different connecting pieces can be made utilizing standarized configurations for use with a variety of garment patterns. The connecting pieces described above are disposed in adjoining relationship to the pattern pieces which they connect.

In FIG. 4 pattern pieces 80 and 81 are joined by a connecting piece 56 to form an endless sensing line to be traced in the clockwise direction indicated by arrow 36. Connector 56 may be adhesively set on a background member such as the plate 5 shown in FIG. 1. In order to avoid relative slippage between the connecting piece and its adjoining pattern pieces, overlay connecting elements, which will be distinguished from the previously described connecting members by the term "combining members", may be provided and these are advantageously supplied as adhesive labels. Combining member 82 has four sections 84, 85, 86, 87 and combining member 83 has four sections 92, 93, 86, 87. Sections 86 and 87 of the two combining members 82 and 83 are the same color as the background 5 (see FIG. 1), whereas sections 84 and 85 of members 82 and sections 92 and 93 of member 83 are transparent or have reflective properties similar the material from which the pattern pieces are made. A pattern component and the background must have contrasting characteristics in order to sharply define the endless sensing line. For example, if one is light reflective, the other is light absorptive or magnetic and nonmagnetic or electrically conductive and insulative or transparent and opaque.

The lines of demarcation between the four sections of each combining element are perpendicularly intersecting lines so that the opposite sections have salient angles, the apexes of which are joined at the at a common point which correspond to the adjoining corners of the pattern piece and connecting piece which they overlie. The salient angles of sections 84 and 92 are defined by lines 88 and 90 which precisely register with corresponding lines on the pattern pieces forming their salient corners. The salient angles of sections 85 and 93 are defined by lines 89 and 91, which precisely register with the lines forming the salient angles of connecting piece 56. The end portions of sections 84, 85, 92 and 93 remote from the abutting salient angles can have any of various configurations, such as rectangular, like sections 92, 93 and 84, or circular, like section 85, or the section may be of triangular or diamond configuration.

As stated above, combining elements such as 82 and 83 may be used as adhesive overlays to secure adjoining pieces against relative movement. That may also serve to prolong the useful life of pattern pieces which may become worn, bent or mutilated from frequent use since the abutting salient angles of the combining members will mask the underlying worn corners. Another application for such combining pieces is shown in FIG. 5. In this instance five adjacent pattern pieces 64, 65, 66, 60 and 67 are connected by a single composite connector 68. Such connector includes five combining members 82 each having one section overlying a salient corner of one pattern piece. The opposite section of each combining element 82 is connected to the next adjacent combining element by a curved strip 94, 95, 96, 97 or 98. It is preferred that the strips be made of flexible material so that they can be bent to form a curved connecting line bent to have each end portion of the sensing line curve disposed tangentially to the adjoining line on combining element 82 defining one side of the salient angle, which side is aligned with a side of the pattern piece salient angle.

As can be readily seen from the illustration of FIG. 5, this arrangement provides a rapid method of laying out a pattern because the ends of connecting strips 94, 95, 96, 97 and 98 do not require precise placement since only the configuration of one curved side of the strip is critical, the end portion of the strip being masked by the inner section of combining member 82. The interior area of composite connector 68 is open so that the background member is exposed, but this is immaterial because only the outer margin of connector 68 will be traced by the sensing device.

Figure 8:
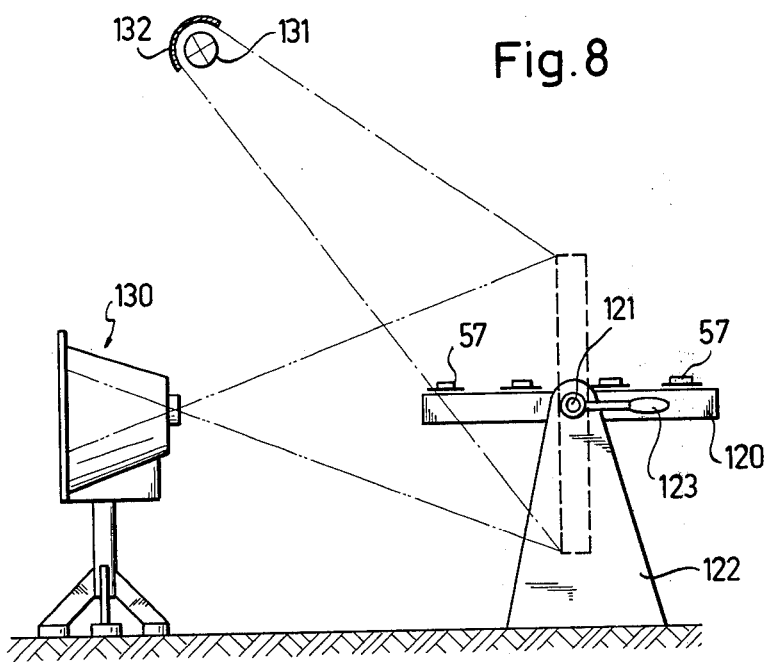
FIG. 8 is an end elevation of a complete system for producing a diapositive program carrier.

In FIG. 8 a pattern layout station is shown on which a pattern can be laid out on a horizontal surface and then quickly moved into a position for cooperating with a sensing device or for photographing to produce a diapositive program carrier. Such pattern can then be immediately disassembled and another pattern laid out. A layout plate 120 is rotatable about a horizontal axis shown as a pivot 121. The pivot is mounted in a frame 122, and a detent device (not shown) on the frame can lock plate 120 in a horizontal position for laying out the pattern and then in a vertical position. A handle 123 connected to pivot 121 provides a convenient means for swinging the plate between its horizontal and vertical positions.

The pattern pieces and the connectors must be firmly secured to the rotatable plate 120, of course. These elements may be made very simply of paper and secured to the plate by permanent magnets 57. In this case the plate is made of iron. If desired, a separate background sheet 5 (see FIG. 1) could be fastened to plate 120 and either sheet 5 or plate 120 could be the iron element cooperating with magnets 57.

The swingable layout table could be used directly with a pattern layout sensing device, in which case the pattern is laid out with plate 120 in its horizontal position and the sensing device is positioned for tracing the pattern outline when the plate is in its vertical position. With such an arrangement neither the sensing device nor the pattern layout need be transported from place to place. Alternatively, the pattern layout may be photographed to produce a diapositive which is subsequently supplied to a cutting machine as a program carrier to be sensed by a sensing device. This is an advantageous arrangement because the pattern layout can be reduced to a small size and the sensing mechanism can be correspondingly small and compact. The use of diapositives also permits use of paper patterns which are less durable and provide less distinct contrast than is desirable for a directly sensed pattern layout.

The swingable table arrangement is particularly useful for producing diapositives because a photographic device 130 can be precisely positioned and fixed in such position relative to the vertical position of plate 120 to effect the sharpest reproduction both with respect to contrast and to lack of distortion while permitting photographing by workers unskilled in photography, the vertical position of the plate being coincident with the focal area of the device 130. A light source 131 and its reflector 132 can also be mounted in fixed relationship to the vertical position of table 120 to provide uniform illumination of the area to be photographed.

The present invention has been described in connection with photoelectric sensing devices, but it can be readily adapted to other kinds of sensing devices, such as electrically inductive sensing mechanism, by appropriate selection of material for the pattern and connecting pieces and the background plate.

Figure 7:
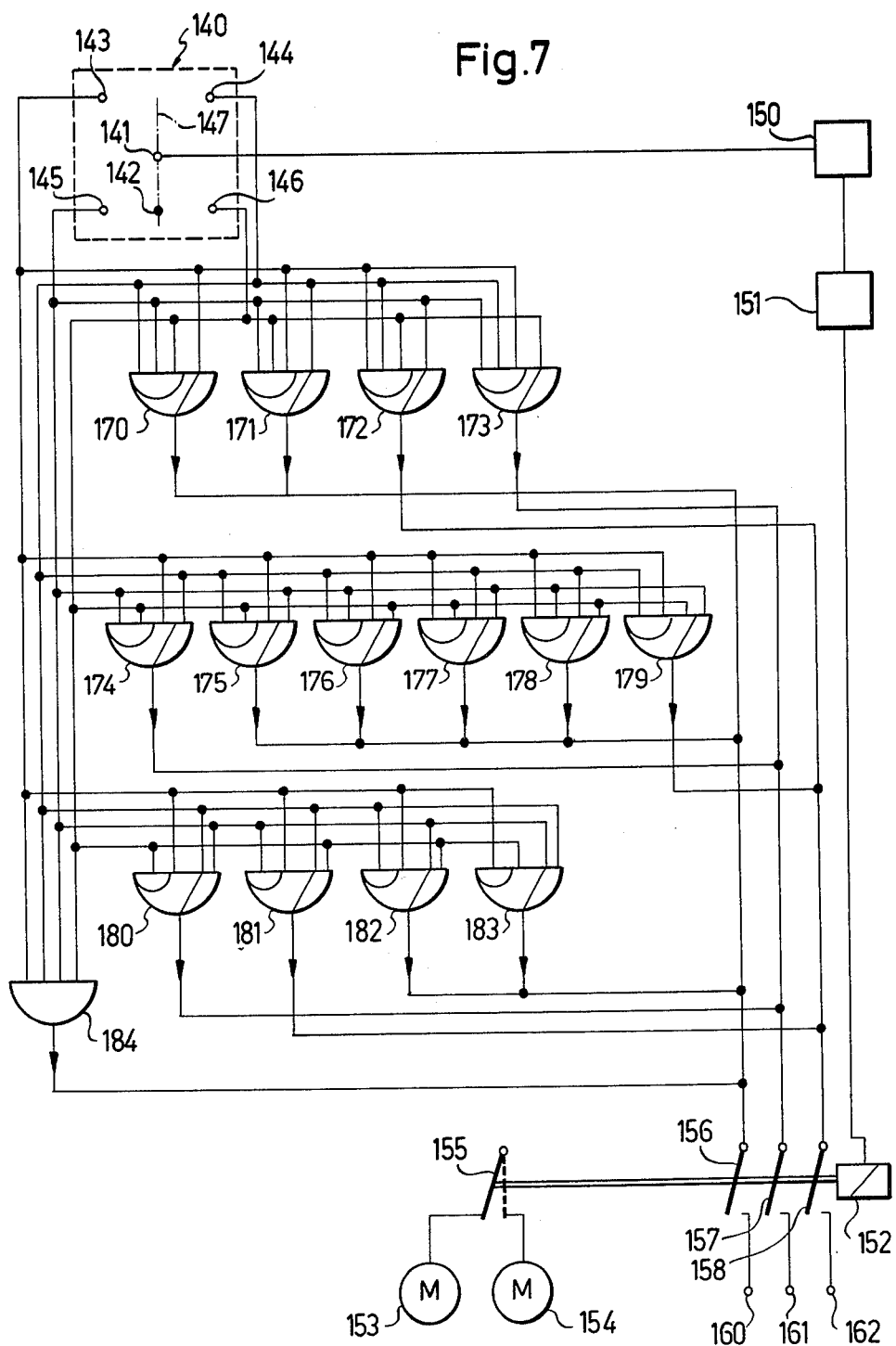
FIG. 7 is a circuit diagram for the sensing device shown in FIG. 6.

FIG. 7 is the circuit diagram for a photoelectric sensing device other than described above. This sensing device permits the sensing of corners regardless of the direction in which it travels relative to a pattern piece. The sensing device 140 includes a sensing line tracing light barrier 141 which causes a regular series of impulses to be emitted when the barrier is half obscured. When the tracer 141 leaves the sensing line contour at a reentrant corner, no signal is emitted. At a salient corner a continuous signal is produced. Alteration of the impulse series, either by complete cessation of the signal or by a continuous signal, operates a switching device 150 to actuate a timer 151. This timer energizes relay 152 to swing switch 155 to open the circuit for motor 153 and close the circuit for motor 154. Motor 153 controls the translational travel of the sensing device and cutting device and motor 154 is a reversible motor which controls rotational movement. A representative cutting device is shown in U.S. Pat. No. 3,304,820. The timer 151 is set in relation to the speed of travel of the sensing device and the distance between tracer 141 and the axis 142 about which the sensing device 140 turns.

In addition to the tracer light barrier 141, sensing device 140 includes auxiliary light barriers 143, 144, 145 and 146 which are arranged evenly around tracer 141 as well as symmetrically with respect to a line 147 passing through tracer 141 and pivot axis 142. Under some circumstances, as few as two auxiliary light barriers would be sufficient, and in other cases eight auxiliary light barriers would be preferable. With respect to the direction of travel of sensing device 140, two light barriers 143 and 144 lead tracer 141 to the left and right, respectively, of the axis of symmetry 147, and two light barriers 145 and 146 trail tracer 141 to the left and right, respectively, of the axis of symmetry. The four auxiliary light barriers are interconnected through electronic blocks to control movement of sensing device 140 so that it runs straight ahead while tracer 141 is running along a cutting line and is turned in a predetermined direction if the tracer leaves the cutting line until the tracer is again positioned on a cutting line.

In the following table the possible conditions for the auxiliary light barriers are presented in tabular form in which the symbol *o* indicates the presence of light and the symbol *x* indicates the absence of light. For this tabulation it is assumed that the pattern and connecting pieces are dark surfaces contrasting with a bright background. The turning direction is indicated with reference to FIG. 7.

that it will not cut material outside the pattern layout area. For this purpose, the output of blocks 170, 171 and 174 would be connected to a corresponding control device for the cutting tool corresponding to the condition that one or both of the leading auxiliary light barriers are activated and both trailing light barriers are not activated. If the sensing device is manually placed in a particular sensing position, those electronic blocks which serve to return the sensing device 140 to a sensing line may be eliminated. For example, blocks 170, 171, 174, 179 and 184 could be eliminated, which blocks represent conditions of major deviations from the sensing line which would be difficult to correct automatically and should result in arresting all movement of the sensing device and the cutting tool.

If desired, the auxiliary light barriers may be deactivated at all times except when the tracer light barrier 141 moves off a sensing line. For this purpose a set of switches 156, 157 and 158 are normally open to interrupt the connection to output contacts 160, 161 and 162, respectively. When switch 150 is actuated by the tracer 141 to swing switch 155 into a position to actu-

| 143 | 144 | 145 | 146 | Electronic Block | Control Output | Command |
|---|---|---|---|---|---|---|
| o | x | x | x | 170 | 160 | straight ahead |
| x | o | x | x | 171 | 160 | straight ahead |
| x | x | o | x | 172 | 162 | turn counterclockwise |
| x | x | x | o | 173 | 161 | turn clockwise |
| o | o | x | x | 174 | 161 | turn clockwise |
| o | x | o | x | 175 | 160 | straight ahead |
| o | x | x | o | 176 | 160 | straight ahead |
| x | o | o | x | 177 | 160 | straight ahead |
| x | o | x | o | 178 | 160 | straight ahead |
| x | x | o | o | 179 | 162 | turn counterclockwise |
| o | o | o | x | 180 | 161 | turn clockwise |
| o | o | x | o | 181 | 162 | turn counterclockwise |
| o | x | o | o | 182 | 160 | straight ahead |
| x | o | o | o | 183 | 160 | straight ahead |
| o | o | o | o | 184 | 160 | straight ahead |

Corresponding to the three commands, there are three control output connections 160, 161 and 162. Output 160 actuates the sensing device to run straight ahead and can, therefore, be connected with the input of switching device 150. Control output 161 effects clockwise rotation of the sensing device 140, whereas control output 162 effects counterclockwise rotation.

Corresponding to the number of possible impulse combinations, fifteen electronic blocks 170 through 184 are provided. Blocks 170 through 173 only transmit an impulse if one auxiliary light barrier receives a light signal to create an impulse, the other three auxiliary light barriers lacking such a signal; blocks 174 through 175 transmit a signal when they receive a simultaneous input from two of the auxiliary light barriers, the other two auxiliary light barriers having received no light signal for creating an impulse; blocks 180 through 183 transmit a signal when three auxiliary light barriers simultaneously create impulses, the fourth auxiliary light barrier providing no impulse; and finally block 184 transmits a signal only when it receives simultaneous impulses from all four auxiliary light barriers 143 through 146.

If desired, other functions can be controlled by the individual blocks 170 through 184. For example, at the beginning of a sensing process when the sensing device has not yet been located on a sensing line of a pattern or connecting piece, the cutting tool can be stopped so ate the turning motor 154, switches 156, 157 and 158 would be closed to permit the auxiliary light barriers to control the direction of rotation and the degree of rotation.

The manner of operation of the sensing device described in connection with FIG. 7 can be illustrated by reference to FIG. 6. The sensing device travels in the direction of arrow 105 to position A at the upper right salient corner of pattern piece 111. As the device 140 continues to travel straight ahead, tracer 141 moves off the sensing line causing switch 150 to open the switch for translational motor 153 after a time delay permitting pivot point 142 to reach the apex of the corner. Rotational motor 154 is energized and the rotational direction is determined by auxiliary light barriers 143 through 146. Since light barriers 143, 144 and 146 receive light and produce impulses while light barrier 145 does not, an impulse is transmitted from block 181 through switch 158 to output connection 162 for effecting counterclockwise rotation. Such rotation will continue until tracer 141 is again in registration with the sensing line whereupon switch 150 immediately deenergizes relay 152 to deenergize rotational motor 154 and to energize motor 153 for resuming normal translational sensing movement. The same procedure occurs at the following salient corner.

The next corner is a reentrant corner and, as the tracer reaches the apex of the angle, the sensing device is in position B. In this position only auxiliary barrier 146 receives a light signal to create an impulse while light barriers 143, 144 and 145 do not emit signals. Electronic block 173 becomes effective to activate output connection 161 to effect rotation of the sensing device in a clockwise direction.

Tracer 141 follows line 104 onto the cutting line of pattern piece 110. At position E tracer 141 has reached the apex of an acute salient angle and light barriers 143, 144 and 145 produce impulses to actuate block 180, which in turn activates output connection 161 to effect rotation of the sensing device 140 in the clockwise direction. At location D, which is an obtuse salient angle, the procedure is the same as at location E. As indicated at location D, a larger obtuse angle would result in blocking light from light barrier 144 as well as barrier 146 which would create an erroneous straight ahead signal through block 176. If such large angles are included in a pattern layout, the auxiliary light barriers could be adjustably carried by the sensing device for relocation to accommodate such angles.

In position C the auxiliary light barriers are ineffective because the tracer 141 has a continuous line 103 to follow across the junction of the two adjoining corners 101 and 102 so that switches 154, 156, 157 and 158 remain open.

The sensing device 140 shown in FIGS. 6 and 7 is especially suitable for executing the sensing line tracing procedure when the adjoining salient corners of the pattern pieces cooperate to form mutually continuous extensions of the corresponding lines from the sides of the salient angles. However, this sensing device can be used to cut pattern layouts in which there are adjoining salient corners having different size angles, so that the angle sides do not align to form continuous intersecting sensing lines. For this purpose only a few changes in the electronic blocks and the connections between the electronic blocks and the output contacts 160, 161 and 162 are necessary.

While the device shown in FIGS. 6 and 7 is equally effective even though some pattern pieces may be traced in a clockwise direction and others may be traced in a counterclockwise direction, it can be readily modified to operate when a definite sensing direction must be established. Assuming such predetermined direction to be clockwise, the connections must be changed as follows:

electronic block 171 is connected to output contact 161
electronic block 177 is connected to output contact 162
electronic block 178 is connected to output contact 161
electronic block 181 is connected to output contact 161
electronic block 183 is connected to output contact 162. The remaining connections are unchanged from those shown in FIG. 7.

If the sensing device is connected in this manner, the pattern pieces of FIG. 5 will be traced in a clockwise direction. The sequence is as follows:

Beginning at the lower curved periphery of starting member 10 to its lower left salient angle, turning clockwise, following the vertical left line, turning counterclockwise on reaching the upper left salient angle, following the straight side of connecting piece 69, turning counterclockwise on reaching the lower left salient angle, downward along the right side of pattern piece 64 to the salient angle having a combining member 82, along the right side of strip 98, clockwise around the entire periphery of pattern piece 67, along the lower side of strip 97, along the right side of pattern piece 60 toward salient angle 61, around the curve 43 of connector 40, along the bottom, up the left side and across the top and down the right side of pattern piece 62, across the straight side 44 of connector 40, up the left side of pattern piece 60, along the left curve of strip 96, along the bottom and completely around the periphery of pattern piece 66 in a clockwise direction, along the upper side of strip 95, upward along the left side of pattern piece 65 and around the entire periphery in a clockwise direction, along the upper side of strip 94, along the left side of pattern piece 64, around the curved side of connector 69, along the top surface and down the left side of stop-start member 10 to the stopping position.

It will be seen that the sensing device rotates in a clockwise direction around salient angles and in a counterclockwise direction to trace reentrant angles.

We claim:

1. Apparatus for automatically controlling a garment component cutting device having drive means, the apparatus including a program carrier bearing a pattern layout defining a sensing line, means for sensing the sensing line and for operating the cutting device drive means for cutting garment components from flat material, the pattern layout having pattern components, including pattern pieces, having peripheries defining sensing lines forming an endless sensing line to be sensed by the sensing means, the improvement comprising each pattern component having at least one peripheral salient angle, the pattern components being laid out with adjoining components being joined at the apexes of salient angles, the sides of each joining salient angle forming substantially continuous crossing sensing lines with the sides of its adjoining salient angle.

2. The apparatus defined in claim 1, further comprising at least one pair of adjoining salient angles joining two pattern pieces, the bodies of such two joined pattern pieces being disposed respectively at opposite sides of a continuous sensing line formed by sides of said adjoining angles.

3. The apparatus defined in claim 1, the pattern components including connecting means for connecting at least two pattern components.

4. The apparatus defined in claim 3, the connecting means being a connecting piece preformed independently of a particular set of pattern pieces and insertable in a pattern layout for joining at least two pattern components.

5. The apparatus defined in claim 4, in which the preformed connecting piece is an adhesive label.

6. The apparatus defined in claim 3, in which the preformed connecting piece has at least two salient angles, the apexes of which are connected to apexes of salient angles of other pattern components by continuous crossing lines.

7. The apparatus defined in claim 3, in which the preformed connecting piece is of biconvex shape.

8. The apparatus defined in claim 3, in which one line of a salient angle is a straight line and the other line of such salient angle is a curved line.

9. The apparatus defined in claim 6, in which the curved line is substantially semicircular.

10. The apparatus defined in claim 3, the pattern components being arranged on a background, the pattern components having characteristics contrasting with characteristics of the background, in which the connecting means includes a combining member having four sections, each section having a salient angle, the apexes of the salient angles of all the sections being located at a common point, two opposite sections including salient angles having characteristics similar to those of the pattern components, and two other opposite sections including salient angles having characteristics similar to those of the background.

11. The apparatus defined in claim 10, in which the connecting means includes a plurality of spaced combining members and a plurality of connecting strips each strip having a continuous sensing line, one section of each combining member that has characteristics similar to the characteristics of the pattern components being connected to the corresponding section of the next adjacent combining member by one of said connecting strips, a side of such one section salient angle being disposed tangentially to the adjoining sensing line portion of the connecting strip, the opposite section of the combining member that has characteristics similar to the characteristics of the pattern components and a pattern component salient angle being disposed in superposed relationship.

12. The apparatus defined in claim 1, and a plate rotatable about a horizontal axis and carrying the pattern layout.

13. The apparatus defined in claim 12, in which the plate is magnetizable, the pattern components are made of paper, and permanent magnet means for securing such pattern components to the plate.

14. The apparatus defined in claim 12, in which the horizontal axis of rotation is a fixed axis, the sensing means being photo electric means located a fixed distance from said axis.

15. The apparatus defined in claim 12, in which the horizontal axis of rotation is a fixed axis, photographic means located a fixed distance from said axis and having a focal area coincident with the rotatable plate when such plate is in a preset rotated position, and a light source and reflector means located a fixed distance from said fixed axis, cooperable to illuminate uniformly the focal area of said photographic means.

16. The apparatus defined in claim 1, the sensing means being photoelectric sensing means, the improvement further comprising the sensing means including carrier means pivotable about an axis perpendicular to the pattern layout, a tracing light barrier carried by said carrier means spaced from the pivot axis for tracing the pattern layout endless sensing line, an imaginary line connecting said tracing light barrier and the pivot axis being substantially parallel to the pattern layout and defining a line of symmetry, at least four auxiliary light barriers carried by said carrier means evenly spaced around said tracing light barrier and arranged symmetrically about the line of symmetry, and electronic circuit means connecting said tracing light barrier and the cutting device drive means for selectively effecting translational movement and rotational movement of the cutting device, said electronic circuit means further connecting the auxiliary light barriers to the cutting device drive means for controlling the direction and the degree of cutting device rotational movement.

17. Apparatus for automatically controlling a garment component cutting device having drive means, the apparatus including a program carrier bearing a pattern layout defining a sensing line, means for sensing the sensing line, and for operating the cutting device drive means for cutting garment components from flat material, the improvement comprising the sensing means including carrier means pivotable about an axis perpendicular to the pattern layout, a tracing light barrier carried by said carrier means spaced from the pivot axis for tracing the pattern layout sensing line, an imaginary line connecting said tracing light barrier and the pivot axis being substantially parallel to the pattern layout and defining a line of symmetry, at least four auxiliary light barriers carried by said carrier means evenly spaced around said tracing light barrier and arranged symmetrically about the line of symmetry, and means connecting said tracing light barrier and the cutting device drive means for selectively effecting translational movement and rotational movement of the cutting device, said connecting means further connecting the auxiliary light barriers to the cutting device drive means for controlling the direction and the degree of cutting device rotational movement.

* * * * *

UNITED STATES PATENT OFFICE
CERTIFICATE OF CORRECTION

Patent No. 3,899,949   Dated August 19, 1975

Inventor(s) Bruno Bystron, W. Gerhard Hoeber and George Goldammer

It is certified that error appears in the above-identified patent and that said Letters Patent are hereby corrected as shown below:

Column 14, line 61, cancel "3" and insert --6--; line 63, cancel "3" and insert --6--; line 66, cancel "6" and insert --8--.

Signed and Sealed this sixteenth Day of December 1975

[SEAL]

Attest:

RUTH C. MASON
*Attesting Officer*

C. MARSHALL DANN
*Commissioner of Patents and Trademarks*